United States Patent [19]

Oppitz et al.

[11] Patent Number: 5,632,502
[45] Date of Patent: May 27, 1997

[54] ROTARY ACTUATOR SUCH AS A ROTARY ACTUATOR FOR A MOTOR VEHICLE SUSPENSION

[75] Inventors: Horst Oppitz, Dittelbrunn; Bernhard Schmitt, Wasserlosen, both of Germany

[73] Assignee: Fichtel & Sachs AG, Schweinfurt, Germany

[21] Appl. No.: 331,045

[22] Filed: Oct. 28, 1994

[30] Foreign Application Priority Data

Nov. 5, 1993 [DE] Germany ............ 43 37 813.7

[51] Int. Cl.⁶ .................................................. B60G 21/00
[52] U.S. Cl. .......................... 280/689; 267/277; 277/27; 280/723
[58] Field of Search .................... 280/689, 723; 267/277, 276; 277/27 XC, 81 P

[56] References Cited

U.S. PATENT DOCUMENTS 4,729,569  3/1988  Muller et al. ............... 277/27
5,188,375  2/1993  Pope et al. ................. 277/27

FOREIGN PATENT DOCUMENTS 1179124   5/1965   Germany.
1992537   5/1968   Germany.
1650103  10/1973   Germany.
4229025   3/1994   Germany.

Primary Examiner—Eric D. Culbreth
Attorney, Agent, or Firm—Nils H. Ljungman and Associates

[57] ABSTRACT

A rotary actuator having a cylinder and a motor shaft as well as end caps which define a working area, a number of ribs on the inside surface of the cylinder and an equal number of vanes on the motor shaft which divide the working area into work chambers, and seals inside grooves in the ribs and the vanes. The work chambers are alternately supplied with hydraulic medium, and the seals hydraulically separate the working chambers from one another. The seals are in the form of one-piece gasket members and there is a space between the seals and the side walls of the groove in the static rest position. The gasket member, via its end surfaces, its surfaces which define the height of the gasket member, and one side wall, perform a sealing function during operation of the rotary actuator.

10 Claims, 6 Drawing Sheets

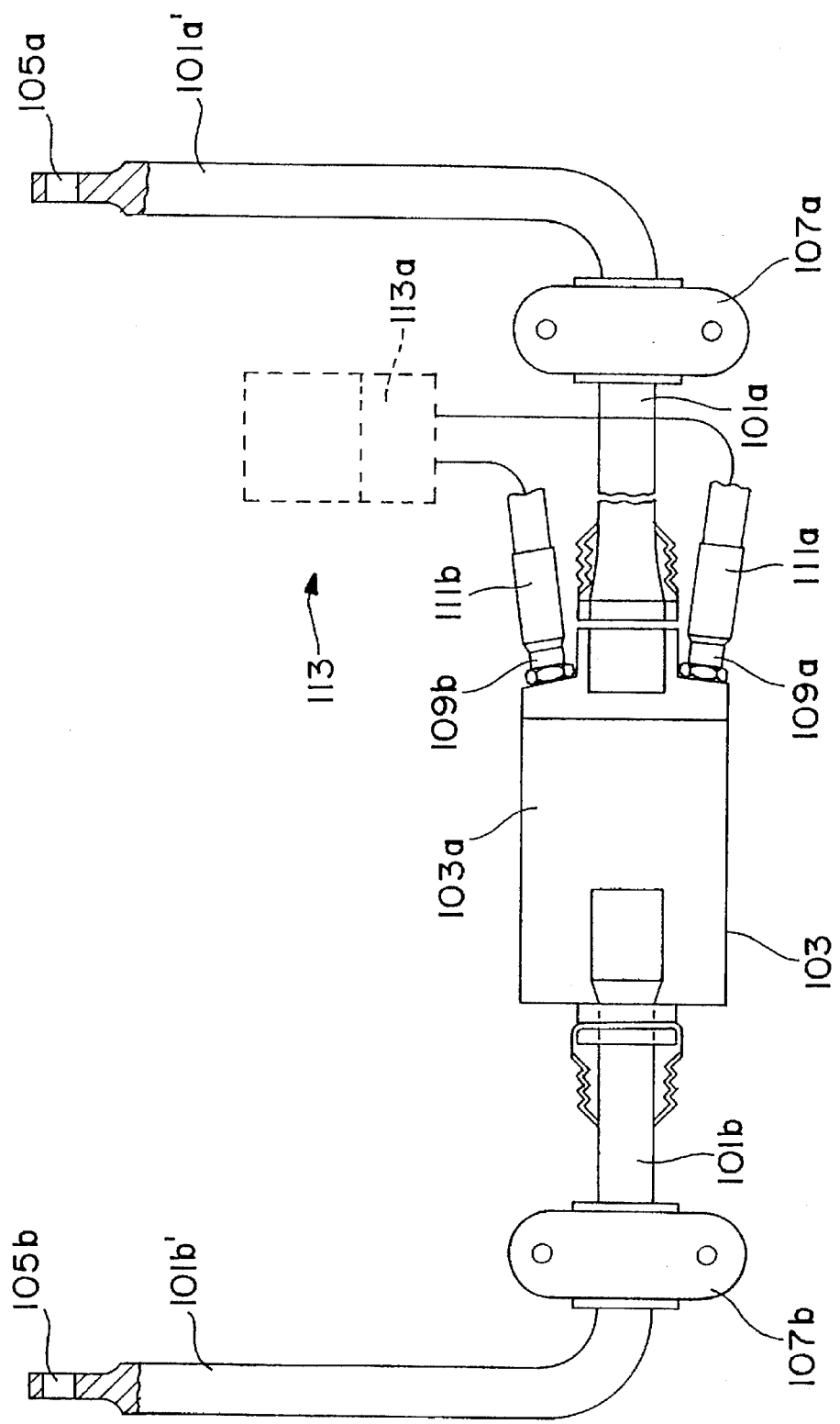

ROTARY ACTUATOR SUCH AS A ROTARY ACTUATOR FOR A MOTOR VEHICLE SUSPENSION

BACKGROUND OF THE INVENTION

1. Field of the Invention

The present invention generally relates to a rotary actuator, such as a hydraulic rotary actuator for use in a suspension of a motor vehicle. Such a hydraulic rotary actuator can essentially have a housing with at least one rib on an inside wall thereof, a motor shaft, disposed at least partially within the housing and having at least one vane on an exterior wall thereof, as well as end caps which seal the ends of the actuator. The housing, motor shaft and end caps define a working area chamber therebetween. The ribs on the inside surface of the cylinder and the vanes on the motor shaft divide the working area into working chambers, which chambers can be alternately supplied with hydraulic medium to relatively rotate the shaft and the housing with respect to one another. Seals are also generally provided inside grooves in the ribs and the vanes, which seals hydraulically separate the work chambers from one another.

2. Background Information

German Patent Application No. 42 29 025.2 discloses one type of rotary actuator in which the manufacturing process is very problematic with regard to the manufacturing of the grooves in the ribs and vanes for the seal units. In this known rotary actuator, the seals used have a width to height ratio that is unfavorable for the inside machining of the cylinder. The grooves for the seal units could only be manufactured to within the required tolerances by means of very costly and complex manufacturing processes, such as spark erosion or slotting. The associated manufacturing expense for this known rotary actuator is therefore unacceptably high for large-scale series production. More economical manufacturing processes, such as broaching with a broaching tool, have failed in the past because the broaching tools broke very quickly due to their small cross-section.

An additional problem is that while multi-part seal units, such as the three part seal unit used by this known actuator, of course work very well, they are also very expensive.

OBJECT OF THE INVENTION

The object of the present invention is therefore to solve the problems associated with known rotary actuators, at the least possible expense, so that large-scale series production can be carried out at an acceptable cost.

SUMMARY OF THE INVENTION

To achieve this object, the present invention teaches that the seals can be realized as one-piece gasket bodies, and that, when a gasket body is in a static or rest position within the grooves of the rotary actuator, there can surprisingly be a space between the gasket body and the side walls of the groove. As such, each gasket body, via its longitudinal end surfaces, its edge surfaces which define the height of the gasket, and one side wall surface, performs a sealing function during operation of the rotary actuator.

Since a space can be provided adjacent the gasket bodies within the grooves, the grooves can be formed to have a greater width than in conventional rotary actuators, thereby providing a width which can enable a broaching tool to be used to form the grooves. Thus, by using a gasket body which essentially does not need to be any thicker than the gasket bodies previously used, the extra groove width, required for the use of a broaching tool for formation of the grooves, can be used as the space between the seal and the side walls of the groove to achieve a flow of hydraulic medium against the seal for applying a dynamic pressure to the seal, with the advantage that friction during operation of the rotary actuator can typically be kept at an extremely low level.

The one-piece construction of the seals can preferably reduce the price of the seals by a factor of several times. In addition, by using a one-piece seal, the groove width tolerance can likewise favorably be increased. This is essentially true, since in contrast to the known multi-part seal units wherein the seal could come apart if not braced against the side walls, etc., thereby resulting in a loss of sealing ability, the one-piece seal essentially cannot come apart. Furthermore, the handling of the seals during assembly of the rotary actuator, or installation of the seals in the rotary actuator, can be simplified significantly, as, among other things, the seal will typically fit into place more easily, and essentially can not fall apart if mishandled.

According to another advantageous feature of at least one embodiment of the present invention, on account of the prestress applied to the seal, the gasket body can generally assume a barrel-shaped cross-section when in the static rest position. In contrast to an arc-shaped cross-section, there can be essentially no excessive flexing of the seals during the continuously changing rotary action of the motor. The danger that the hydraulic pressure will compress the seal is likewise essentially minimized, or even eliminated.

In a still further embodiment of the present invention, to reduce the friction caused by the seals, the surfaces of the gasket body which perform the sealing function can also preferably be divided into a number of individual seal surfaces by means of flow passages. Such flow passages and plurality of seal surfaces can preferably reduce the effect of adherence between the seals and the side walls of the groove.

A further factor which can contribute to reducing the adherence effect, can preferably be achieved by configuring the rotary actuator so that a prestress that is applied to the seal within its groove, is of an amount which, regardless of the hydraulic pressure in the rotary actuator, enables the seals to be slaved, or pulled along, during rotation, as a result of the relative motion between the cylinder and the motor shaft during rotation.

The above discussed embodiments of the present invention will be described further hereinbelow with reference to the accompanying figures. It should be understood that when the word "invention" is used in this application, the word "invention" includes "inventions", that is, the plural of "inventions". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

In summary, one aspect of the invention resides broadly in a rotary actuator comprising: housing apparatus; apparatus for connecting the housing apparatus to a first portion of a motor vehicle suspension; shaft apparatus, the shaft apparatus defining a longitudinal axis; at least a portion of the shaft apparatus being rotatably disposed within the housing apparatus; apparatus for connecting the shaft apparatus to a second portion of a motor vehicle suspension; apparatus for rotatably mounting the at least a portion of the shaft apparatus within the housing apparatus for rotation of at least one of the shaft apparatus and the housing apparatus about the longitudinal axis with respect to the other of the shaft apparatus and the housing apparatus; the shaft apparatus comprising an outer surface disposed towards the housing apparatus; the housing apparatus comprising an inner surface disposed towards the outer surface of the shaft apparatus, the inner surface of the housing apparatus being spaced apart from the outer surface of the shaft apparatus to define a chamber between the shaft apparatus and the housing apparatus; at least one of: the outer surface of the shaft apparatus, and the inner surface of the housing apparatus, comprising at least one projection extending towards the other of: the outer surface of the shaft apparatus, and the inner surface of the housing apparatus; the at least one projection extending from the first axial end of the chamber to the second axial end of the chamber to axially divide the chamber into a first chamber portion and a second chamber portion; apparatus for introducing fluid into at least one of: the first chamber portion, and the second chamber portion, to provide a pressure on the at least one projection to relatively rotate the housing apparatus and the shaft apparatus; the at least one projection comprising: a first side disposed towards the first chamber portion; a second side disposed opposite to the first side and adjacent the second chamber portion; a surface disposed between the first side and the second side, the surface being disposed towards the other of: the outer surface of the shaft apparatus, and the inner surface of the housing apparatus; a longitudinal slot disposed in the surface, the longitudinal slot having two spaced apart side surfaces defining a width of the slot in a circumferential direction with respect to the longitudinal axis, the two spaced apart side surfaces extending substantially parallel to the longitudinal axis; at least one seal apparatus disposed in the longitudinal slot for sealing between the first chamber portion and the second chamber portion to minimize fluid flow from the first chamber portion to the second chamber portion; the seal apparatus having a width in a circumferential direction with respect to the longitudinal axis; and the width of the seal apparatus being substantially less than the width of the slot to define a space between the seal apparatus and at least one of the side surfaces of the slot to permit flow of fluid between the seal apparatus and the at least one side surface of the slot along at least a substantial portion of the seal apparatus.

A further feature of the invention resides broadly in a motor vehicle suspension comprising suspension springs, a rotary actuator for stabilizing uneven deflections of the suspension springs, the rotary actuator comprising: housing apparatus; first connecting rod apparatus for connecting the housing apparatus to a first load bearing portion of the motor vehicle suspension at a first side of the motor vehicle; shaft apparatus, the shaft apparatus defining a longitudinal axis; at least a portion of the shaft apparatus being rotatably disposed within the housing apparatus; second connecting rod apparatus for connecting the shaft apparatus to a second load bearing portion of a motor vehicle suspension at a second side of the motor vehicle; bearing apparatus for rotatably mounting the at least a portion of the shaft apparatus within the housing apparatus for rotation of at least one of the shaft apparatus and the housing apparatus about the longitudinal axis with respect to the other of the shaft apparatus and the housing apparatus; the shaft apparatus comprising an outer surface disposed towards the housing apparatus; the housing apparatus comprising an inner surface disposed towards the outer surface of the shaft apparatus, the inner surface of the housing apparatus being spaced apart from the outer surface of the shaft apparatus to define a chamber between the shaft apparatus and the housing apparatus, the chamber having a first axial end and a second axial end; at least one of: the outer surface of the shaft apparatus, and the inner surface of the housing apparatus, comprising at least one projection extending towards the other of: the outer surface of the shaft apparatus, and the inner surface of the housing apparatus; the at least one projection extending from the first axial end of the chamber to the second axial end of the chamber to axially divide the chamber into a first chamber portion and a second chamber portion; the at least one projection comprising: a first side disposed towards the first chamber portion; a second side disposed opposite to the first side and adjacent the second chamber portion; a surface disposed between the first side and the second side, the surface being disposed towards the other of: the outer surface of the shaft apparatus, and the inner surface of the housing apparatus; and a longitudinal slot disposed in the surface, the longitudinal slot having two spaced apart side surfaces defining a width of the slot in a circumferential direction with respect to the longitudinal axis, the two spaced apart side surfaces extending substantially parallel to the longitudinal axis; at least one seal apparatus disposed in the longitudinal slot for sealing between the first chamber portion and the second chamber portion to minimize fluid flow from the first chamber portion to the second chamber portion; the seal apparatus having a width in a circumferential direction with respect to the longitudinal axis and a length along an axial direction with respect to the longitudinal axis; the width of the seal apparatus being substantially less than the width of the slot to define a space between the seal apparatus and at least one of the side surfaces of the slot along at least a substantial porion of the length of the seal apparatus to permit flow of fluid between the seal apparatus and the at least one side surface of the slot along at least a substantial portion of the length of the seal apparatus; and apparatus for introducing fluid into at least one of: the first chamber portion, and the second chamber portion, to apply pressure to the at least one of: the first side of the projection, and the second side of the projection to relatively rotate the housing apparatus and the shaft apparatus.

BRIEF DESCRIPTION OF THE DRAWINGS

The invention and its essential advantages are described in greater detail below with reference to the accompanying drawings, in which:

FIG. 5 shows a more detailed view of a motor vehicle suspension and a rotary actuator.

DESCRIPTION OF THE PREFERRED EMBODIMENT

Figure 1:
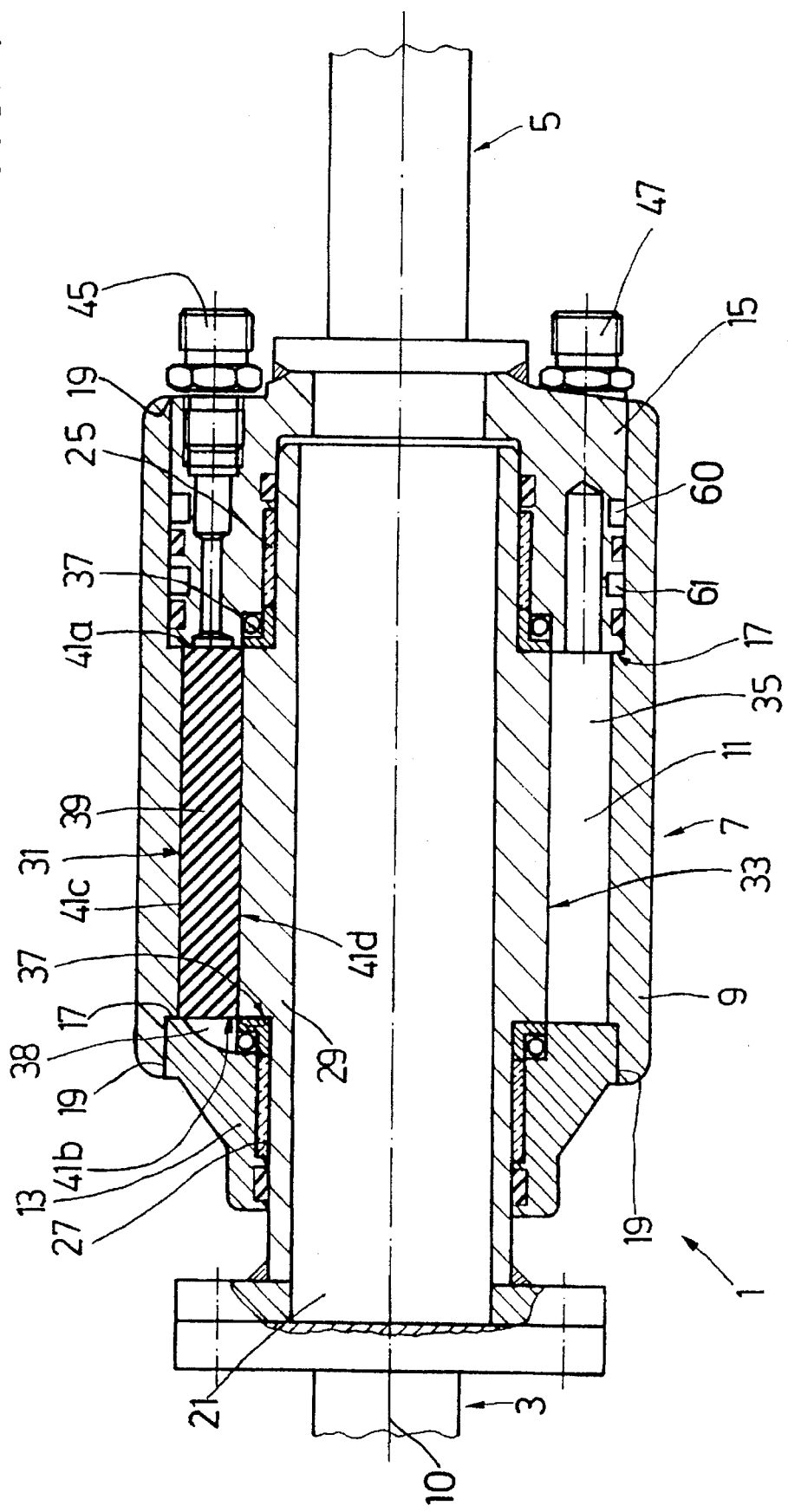
FIG. 1 shows a longitudinal section of a rotary actuator.

FIG. 1 shows a detail of a stabilizer system 1, which is configured as a divided stabilizer having stabilizer parts 3 and 5 and a rotary actuator 7. For reasons of simplicity, the ends of the stabilizers parts 3, 5, connected to the respective wheel control arms, are not shown in this figure but will be discussed in more detail hereinbelow with reference to FIGS. 4 and 5.

The rotary actuator 7 can preferably have at least a housing, or cylinder 9, end caps 13 and 15 disposed on the ends of the cylinder 9, and a rotatable shaft 21 extending into the cylinder 9. The cylinder 9 can preferably define an inside surface 31, or inside diameter, and can have ribs 11 running axially on the inside diameter. The ribs 11 and the cylinder 9 can preferably be realized as a one-piece unit, but two-piece assemblies would also be possible.

The end caps 13 and 15, on the two ends of the cylinder 9, can, together with the cylinder 9, define a working area 35 therebetween. The positioning of the end caps 13 and 15 in the cylinder 9 can preferably be determined by end surfaces 17 of the ribs 11. The end caps 13 and 15 can preferably be connected to the cylinder 9 by a weld seam 19 in the terminal regions of the rotary actuator 7, between the end caps 13 or 15 and the cylinder 9.

Figure 1B:
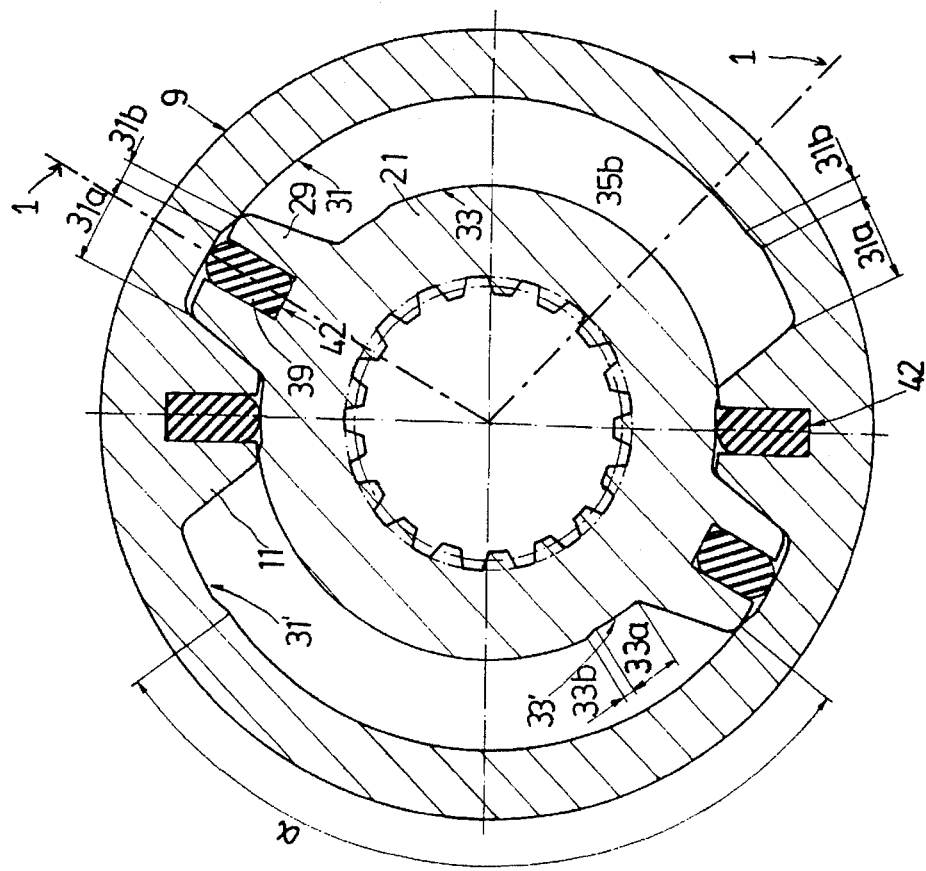
FIGS. 1a and 1b show cross-sectional views of a rotary actuator such as the rotary actuator of FIG. 1.
Figure 1A:
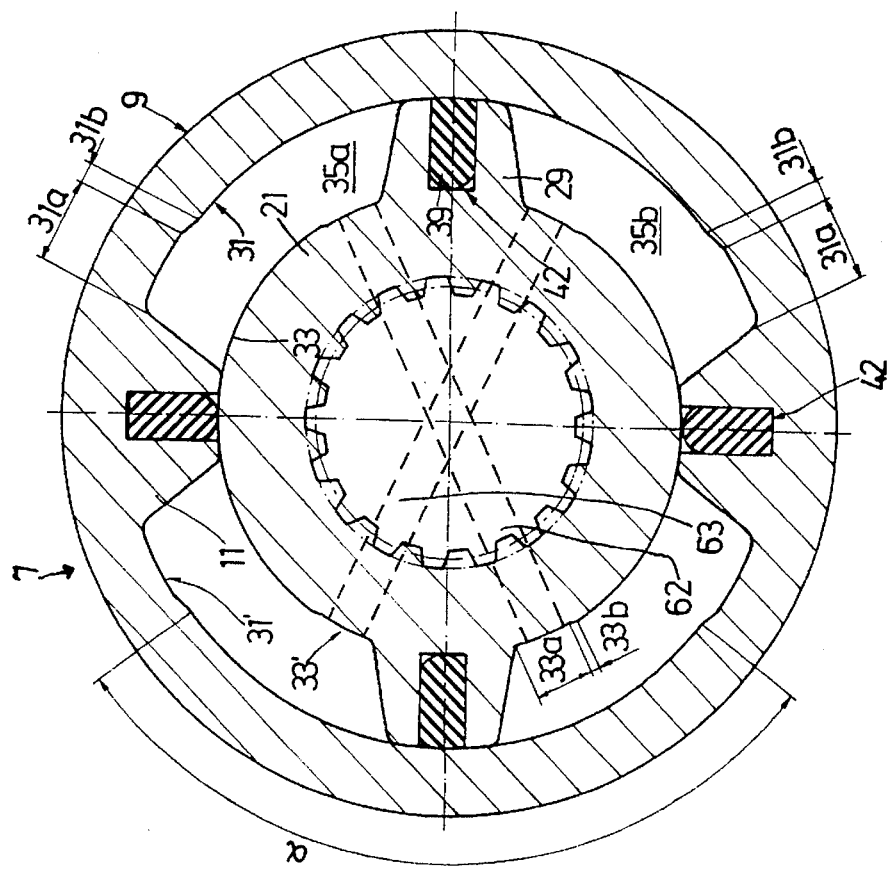

The motor shaft 21 can preferably be mounted in the working area by means of friction bearings 25, 27, in such a manner that there can preferably be relative rotational movement between the shaft 21 and the cylinder 9. The motor shaft 21 can preferably have a number of vanes 29 on its outside surface 33, or outside diameter. These vanes 21 can also preferably have an axial orientation, similar to that of the ribs 11 of the cylinder 9. The ribs 11 and the inside wall surface 31 of the cylinder 9, as well as the vanes 29 and the outside shell surface 33 of the motor shaft 21, preferably define a number of work chambers 35a, 35b, as shown in FIGS. 1a and 1b. The work chambers 35a, 35b can preferably be sealed on the axial ends thereof by means of angular joint gaskets 37 at the base of the vanes 29, preferably between the vanes 29 and the end caps 13, 15.

The end faces of the vanes 29 and the ribs 11 can preferably be sealed by means of seals 39 so that there can be a hydraulic separation between the adjacent work chambers 35a, 35b. The seals 39 can preferably be designed as one-piece discs and can essentially perform a sealing function by means of their end faces 41a–41d and at least one of the side walls 43a, 43b (see FIGS. 2a and 2b). When installed, the operating pressure in the working area preferably increases the static prestress on the seals 39 and provides dynamic sealing. The same can also apply for the angular joint gaskets 37, which can be pressurized with hydraulic medium via at least one recess 38.

The cap 15 can preferably be equipped with a first hydraulic connection 45 and a second hydraulic connection 47. The hydraulic connections 45, 47 can preferably be oriented parallel to the principal axis 10 of the rotary actuator 7. Each of the two hydraulic connections 45, 47 can be directly connected to one of the work chambers 35a, 35b. In addition, an interconnection system, such as shown in FIGS. 1 or 1a, and which interconnection systems are generally well known in the art, and therefore not discussed in any great detail herein, can be provided to form a connection between the work chambers 35a, 35b with the same indexing, whereby the interconnected work chambers 35a, 35b of the first hydraulic connection 45 alternate with the work chambers 35b of the second hydraulic connection 47.

As shown in FIG. 1, fluid bypass grooves 60 and 61 could be provided circumferentially about the end cap 15 between the end cap 15 and the shaft 21, whereby groove 60 could interconnect chambers 35a and groove 61 could interconnect chambers 35b. Alternatively, as shown schematically in FIG. 1a, passages 62 and 63 could be provided through at least a portion of the shaft 21, provided that at least a portion of the shaft 21 is substantially solid therethrough.

FIGS. 1a and 1b show one possible embodiment of a rotary actuator depicting a cross-section through a rotary actuator 7 in the vicinity of the vanes 29 or ribs 11. Inside the vanes 29 and ribs 11, the seals 39 are preferably enclosed in grooves 42. In the depicted view of FIG. 1b, the motor shaft 21 is shown in the starting position within the normal rotary angle range (alpha). The rotary angle range (alpha) is preferably determined by the pump capacity relative to the stabilizer. In this rotary angle (alpha) range, the seals 39 can preferably be prestressed by the groove 42 and the inside wall surface 31 or the outside shell surface 33. Outside of the rotary angle range (alpha), recesses 31', 33' can preferably be worked into the inside wall surface 31 and the outside shell surface 33. The recesses 31' and 33' can include a base surface 31a, 33a respectively preferably connected via a transition surface 31b, 33b to the inside wall surface 31 or the outside shell surface 33. The geometric configuration of the base surface 31a, 33a can be varied with relative freedom, as long as the seal 39 inside the recess 31', 33' remains essentially free of prestress. The transition surfaces 31b, 33b can thereby essentially ensure that the prestress preferably increases continuously to the predetermined level, thereby essentially preventing damage to the seal 39.

In FIG. 1b, the motor shaft 37 is shown twisted in the installation or removal position within the cylinder 9. In at least one direction of rotation, the ribs 11 and the vanes 29 preferably come into contact. This position can essentially easily be defined in a manufacturing robot. Each of the seals 39 can preferably be located in the vicinity of a recess 31', 33' and can therefore be under no prestress. The seals 39 can then be relatively easily installed and removed.

Figure 2A:
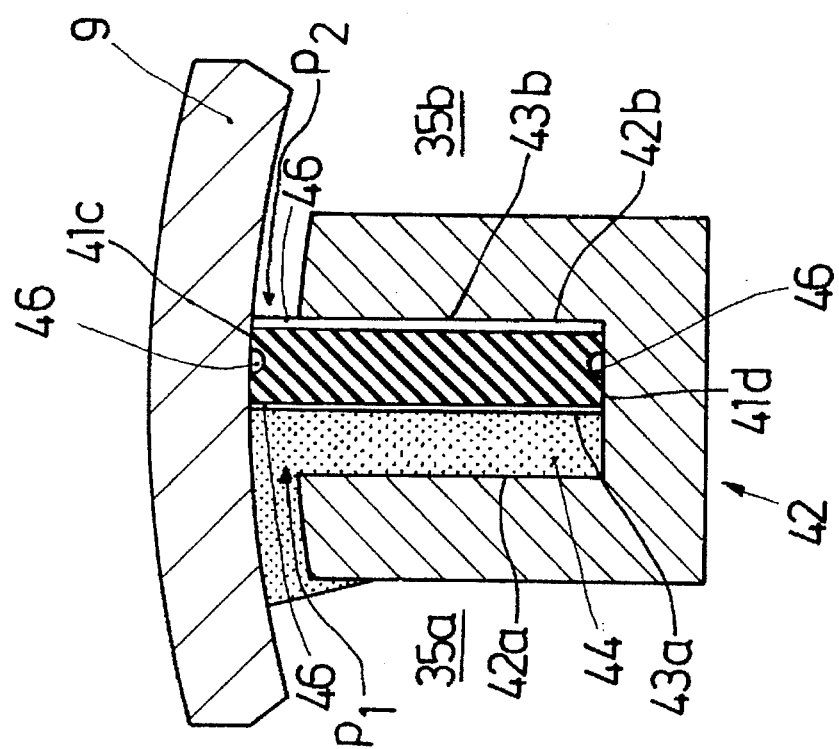
FIGS. 2a–2b show a detail of the vicinity of a seal.
Figure 2B:
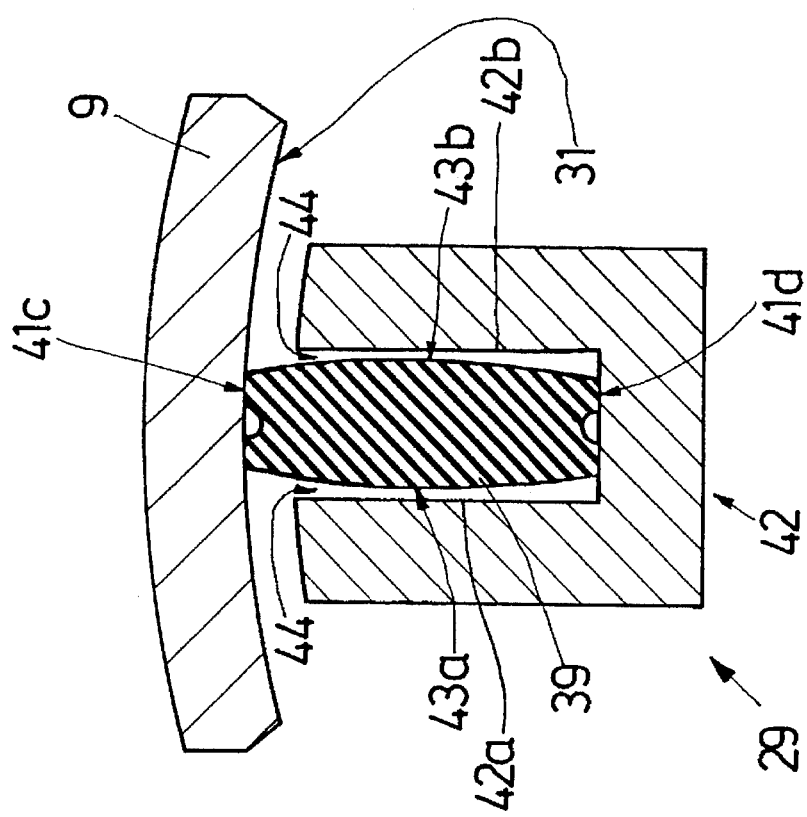

FIGS. 2a–2b show a detailed cross-section through the rotary actuator 7 in the vicinity of the vanes 29 or ribs 11. Inside the vanes 29 and ribs 11, the seals 39 are preferably enclosed in grooves 42. These grooves 42 can be configured to have a width/height ratio which makes it possible to use broaching tools. In the depicted embodiment, this width/height ratio is shown as about 1:2, while other ratios suitable for broaching would also be possible and could be well within the skill of the artisan.

The seal 39 can preferably be narrower than the width of groove 42 and can thereby leave a space 44 between the seal 39 and the groove side walls 42a and 42b. The ratio of the width of the seal to the width of the groove can, in at least one embodiment of the present invention be about 8:9, while variations on this ratio would be possible and well within the skill of the artisan. In the rest position, that is, when the pressure in the work chambers 35a, 35b is essentially equal, the seal 39 can be prestressed essentially only via its surfaces 41c, 41d. This prestress can be provided by applying a radial pressure to the seal 39, in a manner as discussed above with regard to the embodiment depicted in FIG. 1a. Under such a radial prestress, and in the rest position, the seal 39 can have a barrel-shaped cross-section. The space 44, on both sides of the seal walls 42a, 42b, can essentially be filled with hydraulic medium.

FIG. 2b shows one embodiment of an operating condition, or when there is a pressure differential between the chambers 35a, 35b. That is, pressure $P_1$ is greater than pressure $P_2$. The pressure $P_1$ can displace the seal 39 in the groove 42 essentially until a side wall 43a, 43b of the seal 39 comes in contact with a side wall 42a, 42b of the groove. The entire space 44 can then essentially be entirely on one side of the seal 39. Under the pressure of the hydraulic medium, a displacement of volume occurs, which results in an increase in the prestress of the seal 39 in the groove 42. In this position, the seal 39 performs the sealing function by means of its end faces 41a–41d and its side wall 43b.

If a reversal of pressure were then to occur during operation of the rotary actuator, so that $P_2$ becomes greater than $P_1$, the undesirable adherence between the side wall 42b of the groove 42 and the side wall 43b of the seal 39 can essentially be eliminated by pulling the seal along by means of the relative motion between the motor shaft 21 and the cylinder 9.

Figure 3:
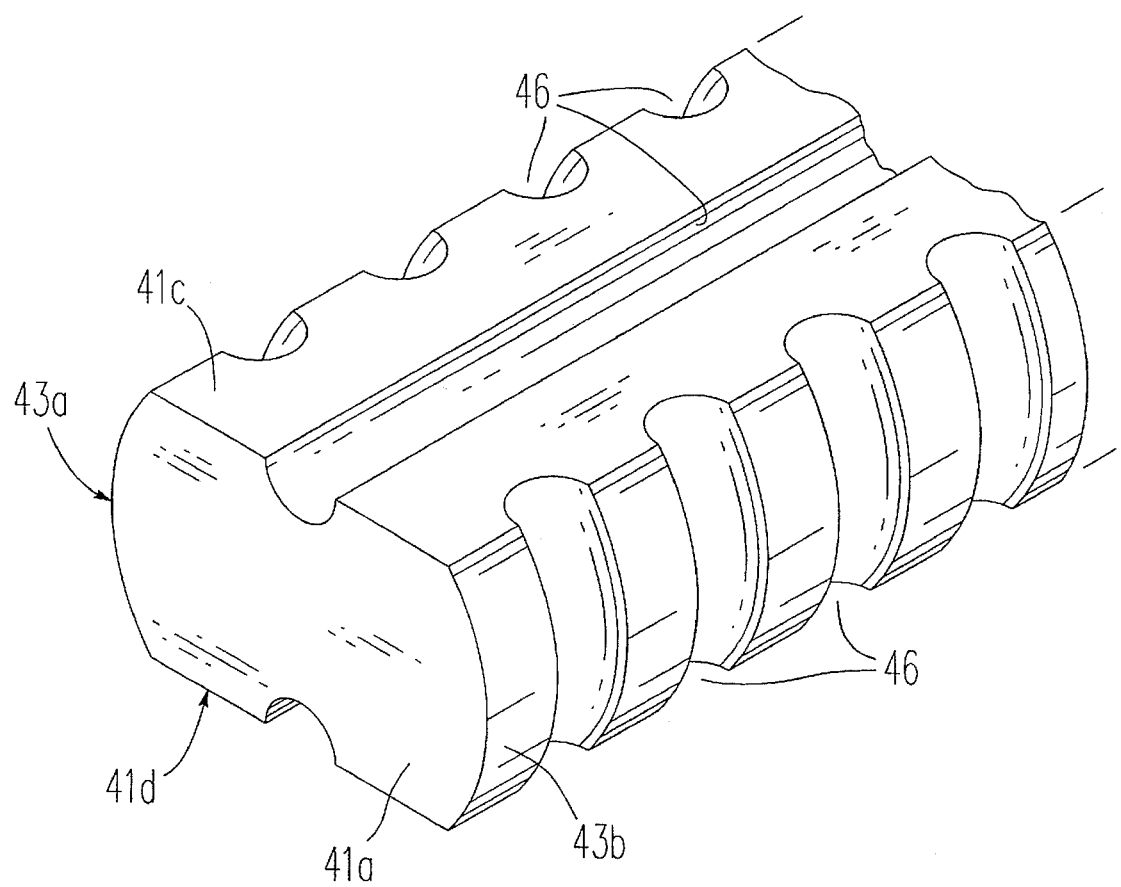
FIG. 3 shows a perspective view of a seal having fluid passages.

In an alternative embodiment of the seal 42, the seal surfaces 41c, 41d, 43a, 43b, can also include flow passages 46, which form individual seal surfaces. One possible embodiment of a seal having flow passage 46 is depicted in FIG. 3 which shows a plan view of a seal 39 and the passages 46. It might also be desirable that the end surfaces 41a, 41b also have such a passage 46.

Figure 4:
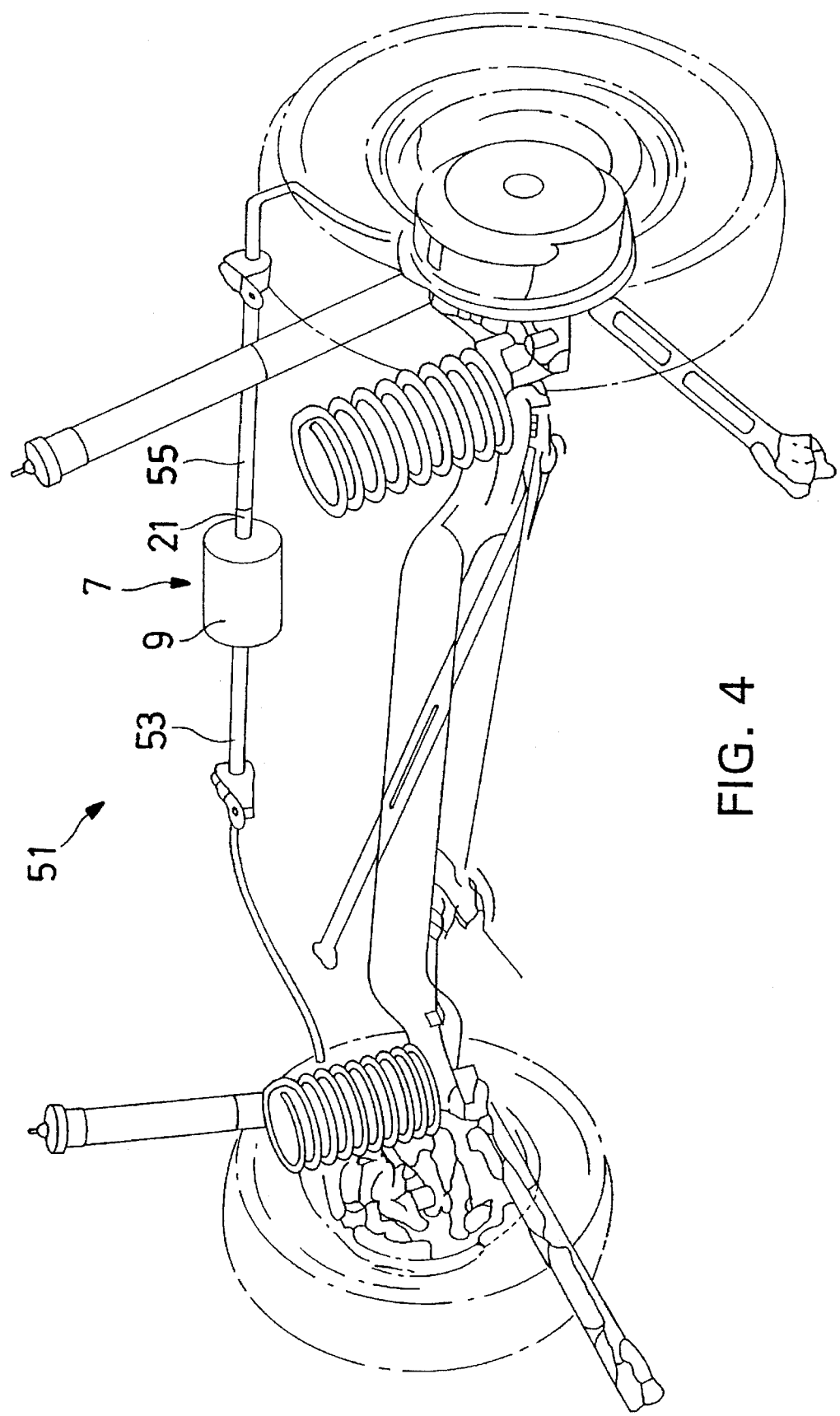
FIG. 4 shows the use of a rotary actuator in accordance with the present invention in a motor vehicle suspension.

FIG. 4 shows the positioning of a rotary actuator 7, in accordance with the present invention, as a part of a stabilizer system 51 of an automobile suspension. The rotary actuator 7 can preferably be attached via housing 9 to one stabilizer bar 53, and via shaft 21 to another stabilizer bar 55.

A more detailed view of the use of a rotary actuator in a motor vehicle suspension, as shown in FIG. 4, is provided in FIG. 5 which represents a stabilizer 101a, 101b with a rotary actuator 103. On angled ends 101a', 101b' there are preferably locators 105a, 105b in which the wheel bearings are engaged, which wheel bearings are not shown in the figure for purposes of simplicity. The stabilizer 101a, 101b is preferably fastened to the vehicle by means of articulated clips 107a, 107b.

The rotary actuator 103 essentially includes a rotary actuator housing 103a and a rotary actuator vane assembly, which vane assembly is not shown in the figure, whereby the rotary actuator housing 103a is preferably non-rotationally connected to the stabilizer part 101a, and the rotary actuator vane assembly is preferably non-rotationally connected to the stabilizer part 101b. In the event of uneven deflection of the vehicle springs, the rotary actuator 103 can be rotated by means of the angled ends 101a', 101b', whereby wheel contact forces interact with the angled ends 101a', 101b' to exert a torsional moment on the stabilizer.

The rotary actuator 103 preferably has two hydraulic connections 109a, 109b which preferably form a connection to a hydraulic system 113 via hydraulic lines 111a, 111b, whereby the hydraulic system 113 preferably includes at least a hydraulic valve 113a. Hydraulic systems in general, and associated hydraulic valves are generally well known, and are therefore not disclosed in any further detail herein. The components of the hydraulic system 113 can be permanently installed in the vehicle so that with each deflection of the vehicle springs or stabilizer movement, there can be a relative movement of the hydraulic lines 111a, 111b with respect to the hydraulic system 113, which movement should preferably be compensated for by the hydraulic lines 111a, 111b together with the hydraulic connections 109a, 109b.

One feature of the invention resides broadly in the rotary actuator comprising a cylinder and a motor shaft as well as end caps which define a working area, a number of ribs on the inside surface of the cylinder and an equal number of vanes on the motor shaft which divide the working area into working chambers which are alternately supplied with hydraulic medium, and seals inside grooves in the ribs and the vanes, which hydraulically separate the working chambers from one another, characterized by the fact that seals 39 are realized as one-piece disks and that there is a space 44 between the seals 39 and the side walls 42a, 42b of the groove in the static rest position, whereby the disk 39, via its end surfaces 41a, 41b, its surfaces 41c, 41d which define the height of the disk, and one side wall 43a, 43b perform a sealing function during operation of the rotary actuator.

Another feature of the invention resides broadly in the rotary actuator characterized by the fact that the disk 39 has a barrel-shaped cross-section in its static rest position.

Yet another feature of the invention resides broadly in the rotary actuator characterized by the fact that the surfaces 41, 43 of the disk 39 providing a seal are divided into a number of individual seal surfaces by means of flow passages 46.

Still another feature of the invention resides broadly in the rotary actuator characterized by the fact that the prestress of the seal 39 in its groove 42 is designed so that, regardless of the hydraulic pressure in the rotary actuator 1, the seals 39 are pulled along by the relative motion between the cylinder 9 and the motor shaft 21 during rotation.

Some types of automobile suspension systems that could be utilized in accordance with the rotary actuator motor may be or are disclosed by the following U.S. Pat. No. 5,178,406 to Reynolds, entitled "Torsion Bar Suspension"; U.S. Pat. No. 5,286,059 to Tabe, entitled "Height Control System when Vehicle Is Jacked Up"; U.S. Pat. No. 5,288,101 to Minnett, entitled "Variable Rate Torsion Control System for Vehicle Suspension"; and U.S. Pat. No. 5,290,048 to Takahashi and Yamashita, entitled "Working Fluid Circuit for Active Suspension Control System of Vehicle".

Some types of rotary actuators that could be utilized in accordance with the present invention may be or are disclosed by the following U.S. Pat. No. 5,332,236 to Kastuhara et al., entitled "Sealing Mechanism for a Rotary Actuator"; U.S. Pat. No. 5,309,816 to Weyer, entitled "Rotary Actuator with External Bearings"; U.S. Pat. No. 5,267,504 to Weyer, entitled "Rotary Actuator with Annular Fluid Coupling Rotatably Mounted to Shaft"; and U.S. Pat. No. 5,310,021 to Hightower, entitled "Motor-driven, Spring-returned Rotary Actuator".

Some types of seals that could be utilized with the present invention may be or are disclosed by the following U.S. Pat. No. 5,321,964 to Lovell et al., entitled "External Seal Device for Tube Hydroforming"; U.S. Pat. No. 5,250,607 to Comert et al., entitled "Moisture Cured Elastomeric Interpenetrating Network Sealants"; U.S. Pat. No. 5,259,737 to Kamisuki et al., entitled "Micropump with Valve Structure"; U.S. Pat. No. 5,234,194 to Smith, entitled "Seal for a Shaft"; and U.S. Pat. No. 5,190,299 to Johnston, entitled "Radially Undulating Shaft Seal".

Broaching methods and broaching tools which could possibly be used to form the grooves in accordance with the present invention may be or are disclosed by the following U.S. Pat. No. 5,183,374 to Line, entitled "Horizontal Broach with a Mobile Standard"; U.S. Pat. No. 5,184,985 to Varinelli et al., entitled "Vertical Broaching Machine with Multiple Broaches"; U.S. Pat. No. 5,242,251 to Armstrong and Bakaian, entitled "Broach and Process of Manufacturing a Broach"; and U.S. Pat. No. 5,246,320 to Krippelz, entitled "Keyway Broach Tool and Method of Broaching Multiple Keyways".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 37 813.7, filed on Nov. 5, 1993, having inventors Horst Oppitz and Bernhard Schmitt, and DE-OS P 43 37 813.7 and P 43 37 813.7, as well as their published equivalents are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A rotary actuator comprising:

housing means;

means for connecting said housing means to a first portion of a motor vehicle suspension;

shaft means, said shaft means defining a longitudinal axis and a circumferential direction disposed circumferentially about the longitudinal axis;

at least a portion of said shaft means being rotatably disposed within said housing means;

means for connecting said shaft means to a second portion of a motor vehicle suspension;

means for rotatably mounting said at least a portion of said shaft means within said housing means for rotation of at least one of said shaft means and said housing means about said longitudinal axis with respect to the other of said shaft means and said housing means;

said shaft means comprising an outer surface disposed towards said housing means;

said housing means comprising an inner surface disposed towards said outer surface of said shaft means, said inner surface of said housing means being spaced apart from said outer surface of said shaft means to define a chamber between said shaft means and said housing means;

at least one of:
     said outer surface of said shaft means, and
     said inner surface of said housing means, comprising at least one projection extending towards the other of:
       said outer surface of said shaft means, and
       said inner surface of said housing means;

said at least one projection extending from said first axial end of said chamber to said second axial end of said chamber to axially divide said chamber into a first chamber portion and a second chamber portion;

means for introducing fluid into at least one of:
     said first chamber portion, and
     said second chamber portion, to provide a pressure on said at least one projection to relatively rotate said housing means and said shaft means;

said at least one projection comprising:
     a first side disposed towards said first chamber portion;
     a second side disposed opposite to said first side and adjacent said second chamber portion;
     a surface disposed between said first side and said second side, said surface being disposed towards the other of:
       said outer surface of said shaft means; and
       said inner surface of said housing means;
     a longitudinal slot disposed in said surface, said longitudinal slot having two spaced apart side surfaces defining a width of said slot in a circumferential direction with respect to said longitudinal axis, said two spaced apart side surfaces extending substantially parallel to said longitudinal axis;
     at least one seal means disposed in said longitudinal slot for sealing between said first chamber portion and said second chamber portion to minimize fluid flow from said first chamber portion to said second chamber portion;

said seal means having a width in a circumferential direction with respect to said longitudinal axis;

said width of said seal means being substantially less than said width of said slot to define a space between said seal means and at least one of said side surfaces of said slot to permit flow of fluid between said seal means and said at least one side surface of said slot along at least a substantial portion of said seal means;

said seal means having a first side surface disposed towards one of said side surfaces of said slot and a second side surface disposed towards the other of said side surfaces of said slot;

only one side surface of said seal means at a time being in sealing engagement with its corresponding side surface of said slot during application of fluid pressure on said at least one projection to relatively rotate said housing means and said shaft means;

said longitudinal slot having a base portion and an open end defining a height of said slot in a radial direction with respect to said longitudinal axis and a first end and a second end defining a length of said slot in a direction substantially parallel to said longitudinal axis;

said width of said seal means being configured to permit flow of fluid into said space along at least a substantial portion of the height of said slot and along at least a substantial portion of the length of said slot;

said rotary actuator having a rest configuration with substantially no pressure being applied to said seal means;

said seal means comprising a first edge disposed adjacent said base of said slot, a second edge disposed adjacent the open end of said slot, a first end disposed adjacent said first end of said slot and a second end disposed adjacent said second end of said slot;

said seal means having a radial prestress between said base of said slot and said other of: said inner surface of said housing and said outer surface of said shaft means towards which said projection extends;

said seal means in said rest configuration under said radial prestress having a barrel-shaped cross-section having a first width at said first and second edges thereof, and a second width between said first and second edges thereof, said second width being greater than said first width and less than said width of said slot;

said first and second side surfaces comprising a plurality of axially disposed fluid passages spaced apart from one another and extending between said first and second edges;

said first and second edges comprising at least one longitudinal fluid passage extending between said first and second ends; and said fluid passages dividing surfaces of said seal means into a plurality of individual sealing surfaces.

2. The rotary actuator according to claim 1, wherein:

said base of said slot is disposed a distance from said other of: said inner surface of said housing and said outer surface of said shaft means towards which said projection extends;

said distance being configured to permit movement of said seal means along said base of said slot and said other of: said inner surface of said housing and said outer surface of said shaft means independent of the fluid pressure applied to said seal means; and said seal means being moveable along said base of said slot and said other of: said inner surface of said housing and said outer surface of said shaft means by said relative rotation between said housing means and said shaft means.

3. The rotary actuator according to claim 2, wherein:

said slot has a height to width ratio of about 2:1; and said second width of said seal means and said width of said slot have a ratio of about 8:9.

4. The rotary actuator according to claim 3, wherein:

said shaft means comprises first and second spaced apart projections disposed at about 180 degrees from one another and axially along said outer surface of said shaft means;

said housing means comprises first and second spaced apart projections disposed at 180 degrees from one another and axially along said inner surface of said housing means;

said first and second projection of said shaft means and said first and second projections of said housing means dividing said chamber into four fluid chambers;

said four fluid chambers comprising a first pair of fluidly connected chambers disposed opposite to one another about said shaft means, and a second pair of fluidly connected chambers disposed opposite one another about said shaft means and between said chamber portions of said first pair;

said first pair of fluidly connected chambers comprising said first chamber portion and said second pair of fluidly connected chambers comprising said second chamber portion; and each of said first and second projections of said shaft means and each of said first and second projections of said housing means comprises one of said seal means separating one chamber of said first chamber portion from one chamber of said second chamber portion.

5. The rotary actuator according to claim 4, wherein:

said housing comprises:

a cylinder having a first axial end and a second axial end;

a first end cap disposed at said first axial end; and a second end cap disposed at said second axial end;

each of said first and second end caps being disposed between said cylinder and said shaft means disposed within said cylinder;

each of said end caps comprising seal means for sealing said end caps to said shaft means to prevent leakage of fluid out of said chamber;

said first and second end caps comprising bearing means for rotatably mounting said shaft means within said cylinder;

at least one of said first and second end caps comprises said means for introducing fluid;

said means for introducing fluid comprise first means for introducing fluid into said first pair or chambers and second means for introducing fluid into said second pair of chambers; and said first and second means for introducing fluid comprises connection means for connecting hydraulic fluid lines to said rotary actuator.

6. In a motor vehicle suspension comprising suspension springs, a rotary acutator for stabilizing uneven deflections of the suspension springs, said rotary actuator comprising:

housing means;

first connecting rod means for connecting said housing means to a first load bearing portion of the motor vehicle suspension at a first side of the motor vehicle;

shaft means, said shaft means defining a longitudinal axis;

at least a portion of said shaft means being rotatably disposed within said housing means;

second connecting rod means for connecting said shaft means to a second load bearing portion of a motor vehicle suspension at a second side of the motor vehicle;

bearing means for rotatably mounting said at least a portion of said shaft means within said housing means for rotation of at least one of said shaft means and said housing means about said longitudinal axis with respect to the other of said shaft means and said housing means;

said shaft means comprising an outer surface disposed towards said housing means;

said housing means comprising an inner surface disposed towards said outer surface of said shaft means, said inner surface of said housing means being spaced apart from said outer surface of said shaft means to define a chamber between said shaft means and said housing means, said chamber having a first axial end and a second axial end;

at least one of:
  said outer surface of said shaft means, and
  said inner surface of said housing means, comprising at least one projection extending towards the other of:
  said outer surface of said shaft means, and
  said inner surface of said housing means;

said at least one projection extending from said first axial end of said chamber to said second axial end of said chamber to axially divide said chamber into a first chamber portion and a second chamber portion;

said at least one projection comprising:
  a first side disposed towards said first chamber portion;
  a second side disposed opposite to said first side and adjacent said second chamber portion;

a surface disposed between said first side and said second side, said surface being disposed towards the other of:
  said outer surface of said shaft means, and
  said inner surface of said housing means; and a longitudinal slot disposed in said surface, said longitudinal slot having two spaced apart side surfaces defining a width of said slot in a circumferential direction with respect to said longitudinal axis, said two spaced apart side surfaces extending substantially parallel to said longitudinal axis;

at least one seal means disposed in said longitudinal slot for sealing between said first chamber portion and said second chamber portion to minimize fluid flow from said first chamber portion to said second chamber portion;

said seal means having a width in a circumferential direction with respect to said longitudinal axis and a length along an axial direction with respect to said longitudinal axis;

said width of said seal means being substantially less than said width of said slot to define a space between said seal means and at least one of said side surfaces of said slot along at least a substantial porion of the length of said seal means to permit flow of fluid between said seal means and said at least one side surface of said slot along at least a substantial portion of said length of said seal means;

means for introducing fluid into at least one of:
said first chamber portion, and
said second chamber portion, to apply pressure to said at least one of:
said first side of said projection, and
said second side of said projection to relatively rotate said housing means and said shaft means;

said longitudinal slot having a base portion and an open end defining a height of said slot in a radial direction with respect to said longitudinal axis and a first end and a second end defining the length of said slot in a direction substantially parallel to said longitudinal axis;

said width of said seal means being configured to permit flow of fluid into said space along at least a substantial portion of the height of said slot and along at least a substantial portion of the length of said slot;

said seal means having a first side surface disposed towards one of said side surfaces of said slot and a second side surface disposed towards the other of said side surfaces of said slot;

only one side surface of said seal means at a time being in sealing engagement with its corresponding side surface of said slot during application of fluid pressure on said at least one projection to relatively rotate said housing means and said shaft means;

said rotary actuator having a rest configuration with substantially no pressure being applied to said seal means;

said seal means comprising a first edge surface disposed adjacent said base of said slot, a second edge surface disposed adjacent the open end of said slot, a first end disposed adjacent said first end of said slot and a second end disposed adjacent said second end of said slot;

said seal means having a radial prestress between said base of said slot and said other of: said inner surface of said housing and said outer surface of said shaft means towards which said projection extends;

said seal means in said rest configuration under said radial prestress having a barrel-shaped cross-section having a first width at said first and second edge surfaces thereof, and a second width between said first and second edge surfaces thereof, said second width being greater than said first width and less than said width of said slot;

said first and second side surfaces comprising a plurality of axially disposed fluid passages spaced apart from one another and extending between said first and second edge surfaces;

said first and second edge surfaces comprising at least one longitudinal fluid passage extending between said first and second ends; and said fluid passages dividing said side and edge surfaces of said seal means into a plurality of individual sealing surfaces.

7. The rotary actuator in a suspension according to claim 6, wherein:

said base of said slot is disposed a distance from said other of: said inner surface of said housing and said outer surface of said shaft means towards which said projection extends;

said distance being configured to permit movement of said seal means along said base of said slot and said other of: said inner surface of said housing and said outer surface of said shaft means independent of the fluid pressure applied to said seal means; and said seal means being moveable along said base of said slot and said other of: said inner surface of said housing and said outer surface of said shaft means by said relative rotation between said housing means and said shaft means.

8. The rotary actuator in a suspension according to claim 7, wherein:

said slot has a height to width ratio of about 2:1; and said second width of said seal means and said width of said slot have a ratio of about 8:9.

9. The rotary actuator in a suspension according to claim 8, wherein:

said shaft means comprises first and second spaced apart projections disposed at about 180 degrees from one another and axially along said outer surface of said shaft means;

said housing means comprises first and second spaced apart projections disposed at 180 degrees from one another and axially along said inner surface of said housing means;

said first and second projection of said shaft means and said first and second projections of said housing means dividing said chamber into four fluid chambers;

said four fluid chambers comprising a first pair of fluidly connected chambers disposed opposite to one another about said shaft means, and a second pair of fluidly connected chambers disposed opposite one another about said shaft means and between said chamber portions of said first pair;

said first pair of fluidly connected chambers comprising said first chamber portion and said second pair of fluidly connected chambers comprising said second chamber portion; and each of said first and second projections of said shaft means and each of said first and second projections of said housing means comprises one of said seal means separating one chamber of said first chamber portion from one chamber of said second chamber portion.

10. The rotary actuator according to claim 9, wherein:

said housing comprises:
a cylinder having a first axial end and a second axial end;
a first end cap disposed at said first axial end; and
a second end cap disposed at said second axial end;

each of said first and second end caps being disposed between said cylinder and said shaft means disposed within said cylinder;

each of said first and second end caps being welded to said cylinder;

each of said end caps comprising seal means for sealing said end caps to said shaft means to prevent leakage of fluid out of said chamber;

said first and second end caps comprising bearing means for rotatably mounting said shaft means within said cylinder;

at least one of said first and second end caps comprises said means for introducing fluid;

said means for introducing fluid comprise first means for introducing fluid into said first pair of chambers and second means for introducing fluid into said second pair of chambers;

said first and second means for introducing fluid comprises connection means for connecting hydraulic fluid lines to said rotary actuator;

said rotary actuator further comprises hydraulic fluid pump means for supplying fluid under pressure to said chambers of said rotary actuator via said hydraulic fluid lines;

said rotary actuator has a first end and a second end, said first end being disposed towards the first side of the motor vehicle and the second end being disposed towards the second side;

said first connecting rod means comprises a first L-shaped connecting rod, said L-shaped connecting rod having a first leg portion connected to said housing means and disposed substantially parallel to said longitudinal axis of said shaft means, and a second leg portion disposed substantially perpendicularly to said first leg portion;

said second connecting rod means comprises a first L-shaped connecting rod, said L-shaped connecting rod having a first leg portion connected to said shaft means and disposed substantially parallel to said longitudinal axis of said shaft means, and a second leg portion disposed substantially perpendicularly to said first leg portion;

said second leg portions of said first and second L-shaped connecting rods having a first end for being connected to said load bearing portions of the suspension;

said rotary actuator comprises means for rotatably mounting said first leg portions of said first and second L-shaped connecting rods to the motor vehicle; and said relative rotation of said shaft means with respect to said housing means relatively rotates said first leg portion of said first L-shaped connecting rod in a first direction to move said second end of said first L-shaped connecting rod in a first vertical direction, and relatively rotates said first leg portion of said second L-shaped connecting rod in a second direction opposite to said first direction to move said second end of said first L-shaped connecting rod in a second vertical direction opposite to said first vertical direction to thereby raise one side of the motor vehicle while simultaneously lowering the other side of the motor vehicle.

* * * * *